(12) United States Patent
Shon et al.

(10) Patent No.: US 10,050,240 B2
(45) Date of Patent: Aug. 14, 2018

(54) ELECTROCHEMICAL CELL

(71) Applicant: Samsung Electronics Co., Ltd., Suwon-si, Gyeonggi-do (KR)

(72) Inventors: Jeongkuk Shon, Hwaseong-si (KR); Jaejun Chang, Seoul (KR); Junhwan Ku, Seongnam-si (KR); Minsang Song, Seongnam-si (KR); Sangmin Ji, Yongin-si (KR); Jaeman Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 191 days.

(21) Appl. No.: 15/161,497

(22) Filed: May 23, 2016

(65) Prior Publication Data
US 2017/0141361 A1 May 18, 2017

(30) Foreign Application Priority Data
Nov. 17, 2015 (KR) .......................... 10-2015-0161055

(51) Int. Cl.
*H01M 2/02* (2006.01)
*H01M 2/08* (2006.01)

(52) U.S. Cl.
CPC .......... *H01M 2/0287* (2013.01); *H01M 2/026* (2013.01); *H01M 2/0277* (2013.01); *H01M 2/08* (2013.01); *H01M 2220/30* (2013.01)

(58) Field of Classification Search
None
See application file for complete search history.

(56) References Cited

U.S. PATENT DOCUMENTS

2012/0301730 A1* 11/2012 Yagi ...................... B32B 27/00
428/447
2013/0244119 A1 9/2013 Schaefer
2014/0234689 A1 8/2014 Kim et al.
(Continued)

FOREIGN PATENT DOCUMENTS

JP 2015-116818 A 6/2015
KR 1020130037964 A 4/2013
(Continued)

OTHER PUBLICATIONS

Geim et al., "The rise of graphene", Nature Materials, vol. 6, Mar. 2007, pp. 183-191.
(Continued)

*Primary Examiner* — Scott J Chmielecki
(74) *Attorney, Agent, or Firm* — Cantor Colburn LLP

(57) ABSTRACT

An electrochemical cell includes: an electrode assembly; and a housing including a first sheet and a second sheet, wherein the first sheet includes a first gas blocking layer, and a first sealing layer, and wherein the second sheet includes a second gas blocking layer and a second sealing layer, wherein the housing defines an accommodation region which accommodates the electrode assembly, which is disposed between the first sheet and the second sheet, and wherein the housing includes a bonded member, wherein the bonded member includes a third gas blocking layer disposed between the first gas blocking layer and the second gas blocking layer, wherein the third gas blocking layer includes a plurality of nanostructures.

20 Claims, 6 Drawing Sheets

(56) References Cited

U.S. PATENT DOCUMENTS

| | | |
|---|---|---|
| 2015/0125758 A1 | 5/2015 | Zhou et al. |
| 2015/0140397 A1 | 5/2015 | Tajima et al. |
| 2016/0099454 A1* | 4/2016 | Kwon .................. H01M 2/204 |
| | | 429/159 |
| 2016/0237237 A1* | 8/2016 | Tour ........................ C08L 75/04 |

FOREIGN PATENT DOCUMENTS

| | | |
|---|---|---|
| KR | 101308592 B1 | 9/2013 |
| KR | 1020140120557 A | 10/2014 |
| KR | 1020150086037 A | 7/2015 |
| WO | 2014/000246 A1 | 1/2014 |

OTHER PUBLICATIONS

Golman et al., "Liquid permeation through cast tape of graphite particles based on non-uniform packing structure", Journal of Power Sources, vol. 159, 2006, pp. 328-331.
Lei et al., "Lithium Storage Characteristics and Possible Applications of Graphene Materials", Acta Chimica Sinica, vol. 72, 2014, pp. 333-344.
Lin et al., "Experiment and simulation of a LiFePO4 battery pack with a passive thermal management system using composite phase change material and graphite sheets", Journal of Power Sources, vol. 275, 2015, pp. 742-749.

* cited by examiner

ELECTROCHEMICAL CELL

CROSS-REFERENCE TO RELATED APPLICATION

This application claims priority to and the benefit of Korean Patent Application No. 10-2015-0161055, filed on Nov. 17, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrochemical cell.

2. Description of the Related Art

In line with technical advances in electronic fields, the market for various kinds of portable electronic devices such as mobile phones, game machines, portable multimedia players (PMPs), MPEG audio layer-3 (MP3), smart watches, smart phones, smart pads, e-book terminals, tablet computers, and wearable devices that attach to human bodies has been rapidly growing. As such as the portable electronic device-related market continues to grow, demand for batteries suitable for use in driving portable electronic devices are also increasing.

Unlike primary batteries, which are not rechargeable, secondary batteries are chargeable and dischargeable. In particular, lithium secondary batteries have higher voltages and higher energy densities per unit weight than nickel-cadmium batteries and nickel-hydrogen batteries. Recently, research into flexible secondary batteries is also underway. Thus there remains a need for an improved electrochemical cell.

SUMMARY

Provided is an electrochemical cell having enhanced gas blocking characteristics.

Additional aspects will be set forth in part in the description which follows and, in part, will be apparent from the description, or may be learned by practice of the presented embodiments.

According to an aspect of an embodiment, an electrochemical cell includes an electrode assembly, and a housing configured to accommodate the electrode assembly and including a first sheet and a second sheet, wherein the first sheet includes a first gas blocking layer, and a first sealing layer, and wherein the second sheet includes a second gas blocking layer and a second sealing layer, wherein the housing defines an accommodation region which accommodates the electrode assembly, which is disposed between the first sheet and the second sheet, wherein the housing includes a bonded member, wherein the bonded member includes a third gas blocking layer disposed between the first gas blocking layer and the second gas blocking layer, wherein the third gas blocking layer includes a plurality of nanostructures.

An electrochemical cell including, a housing including a first sheet including a first gas blocking layer and first sealing layer on an inner surface of the first gas blocking layer, a second sheet including a second gas blocking layer and a second sealing layer on an inner surface of the second gas blocking layer, and a third gas blocking layer disposed between the first gas blocking layer and the second gas blocking layer and adjacent to adjacent edge portions of the first sealing layer and the second sealing layer, wherein the third gas blocking layer includes a plurality of nanostructures; and an electrode assembly disposed within a space defined by the first sheet and the second sheet.

A method of manufacturing an electrochemical cell, the method including: providing first sheet including a first gas blocking layer and first sealing layer on an inner surface of the first gas blocking layer; disposing an electrode assembly on the first sealing layer; disposing a second sheet on the electrode assembly, wherein the second sheet includes a second gas blocking layer and a second sealing layer; bonding an inner portion of the first sealing layer to an inner portion of the second sealing layer to form a fused sealing layer; disposing a composition including a plurality of nanostructures between edge portions of the first sealing layer and the second sealing layer; and fusing the edge portions of the first sealing layer and the second sealing layer and the nanostructures to form a third gas blocking layer between the first gas blocking layer and the second gas blocking layer, wherein the third gas blocking layer is adjacent to the fused sealing layer, wherein the third gas blocking layer includes the plurality of nanostructures to manufacture the electrochemical cell.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
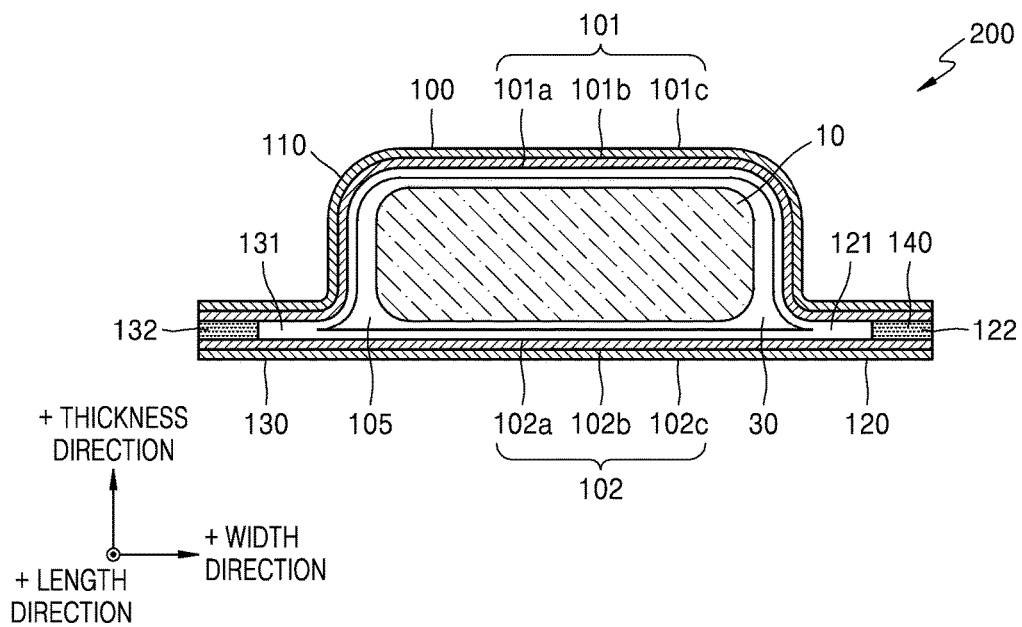
FIG. 1 is a schematic cross-sectional view illustrating a structure of an electrochemical cell according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

In the drawings, the size or thickness of each element may be exaggerated for clarity of explanation. In addition, it will be understood that when a predetermined material layer is referred to as being "on" a substrate or another layer, it can be directly on the substrate or the other layer or a third layer may also be present therebetween. In addition, in the following embodiments, a material for forming each of a plurality of layers is for illustrative purposes only and other materials may also be used.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrochemical cell according to an embodiment will be described in more detail.

An electrochemical cell according to an embodiment includes an electrode assembly and a housing configured to accommodate the electrode assembly and including: a first sheet including a first gas blocking layer and a first sealing layer; and a second sheet including a second gas blocking layer and a second sealing layer. The housing includes an accommodation region which defines an internal area to accommodate the electrode assembly disposed between the first sheet and the second sheet and a bonded part formed by bonding edges of the first and second sheets together, the bonded part comprising a third gas blocking layer between the first gas blocking layer and the second gas blocking layer, wherein the third gas blocking layer includes a plurality of nanostructures.

The electrochemical cell may comprise a housing comprising a first sheet comprising a first gas blocking layer and first sealing layer on an inner surface of the first gas blocking layer, a second sheet comprising a second gas blocking layer and a second sealing layer on an inner surface of the second gas blocking layer, and a third gas blocking layer disposed between the first gas blocking layer and the second gas blocking layer and adjacent to adjacent edge portions of the first sealing layer and the second sealing layer, wherein the third gas blocking layer comprises a plurality of nanostructures; and an electrode assembly disposed within a space defined by the first sheet and the second sheet.

Since the bonded part of the electrochemical cell further includes the third gas blocking layer disposed between the first and second gas blocking layers and including the nanostructures, permeation of gases and/or moisture into the internal area of the electrochemical cell via the bonded part is suppressed and accordingly, the lifespan of the electrochemical cell may be enhanced.

Figure 2:
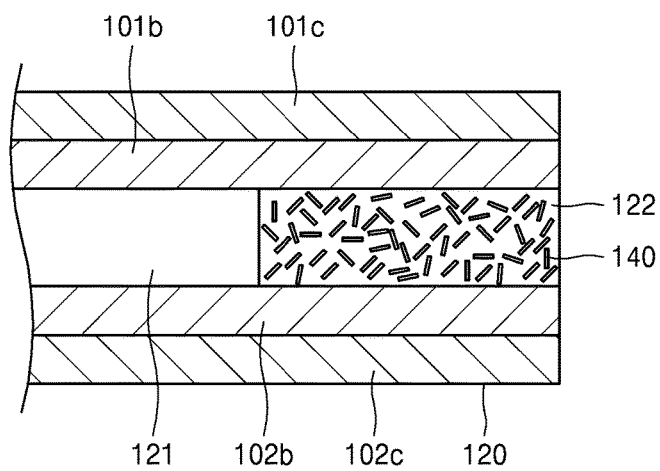
FIG. 2 is an enlarged view of a first bonded part of FIG. 1.

Referring to FIG. 1 and FIG. 2, which is an enlarged view of a first bonded member 120 of FIG. 1, an electrochemical cell 200 includes an electrode assembly 10 and a housing 100 to accommodate the electrode assembly 10. The housing 100 includes a first sheet 101 and a second sheet 102, the first sheet 101 including a first gas blocking layer 101b and a first sealing layer 101a and the second sheet 102 including a second gas blocking layer 102b and a second sealing layer 102a. In addition, the housing 100 includes a region having an internal area 105 to accommodate the electrode assembly 10, which is disposed between the first sheet 101 and the second sheet 102 and the first bonded member 120 and a second bonded members 130 that are formed by bonding inner portions of the first and second sealing layers 101a and 102a together. In addition, the first and second bonded members 120 and 130 include third gas blocking layers 122 and 132 between the first gas blocking layer 101b and the second gas blocking layer 102b, and the third gas blocking layers 122 and 132 include a plurality of nanostructures 140. In addition, the first sheet 101 and the second sheet 102 may further include a first external insulating layer 101c and a second external insulating layer 102c, respectively at the respective outermost parts thereof. In addition, the electrochemical cell 200 may further include an electrolyte 30 disposed together with the electrode assembly 10 in the internal area 105. Although FIG. 1 shows first and second bonded members 120 and 130 as separate elements for clarity, it is noted that the first and second bonded members 120 and 130 may be portions of a same bonded part. For example, in an embodiment in which the electrochemical cell is cylindrical, the bonded part would encircle an edge of the electrochemical cell, and in cross-section would show two portions, e.g., the first and second bonded members 120 and 130.

Since the third gas blocking layers 122 and 132 are disposed between the first gas blocking layer 101b and the second gas blocking layer 102b, the internal area 105 for accommodating the electrode assembly 10 is completely surrounded by the first and second gas blocking layers 101b and 102b, respectively, and by the third gas blocking layer 122 and 132, and thus permeation of gaseous molecules and/or moisture into the internal area 105 may be prevented or suppressed. The third gas blocking layers 122 and 132 may be disposed between the first and second gas blocking layers 101b and 102b in the entire area of the first and second bonded members 120 and 130, which may be formed by bonding the edges of the first and second sheets 101 and 102 together. Although not shown in the drawings, the third gas blocking layers 122 and 132 entirely bond the edges of the first and second sheets 101 and 102 together. For example, referring to FIG. 3, a third gas blocking layer entirely bonds the edges of the electrochemical cell 200 together and is disposed between the first and second sheets.

Referring to FIGS. 1 and 2, in the first and second bonded members 120 and 130, the first sealing layer 101a and the second sealing layer 102a may be completely fused so as to form a single layer. Hereinafter, the single layer formed by completely fusing the first and second sealing layers 101a and 102a is referred to as a fused sealing layer. For example, the first bonded member 120 may include a first fused sealing layer 121 at a right edge portion of the electrochemical cell 200 by fusing the first and second sealing layers 101a and 102a, and the second bonded member 130 may include a second fused sealing layer 131 at a left edge portion of the electrochemical cell 200 by fusing the first and second sealing layers 101a and 102a.

Referring to FIGS. 1 and 2, the third gas blocking layers 122 and 132 may be respectively separated from the internal area 105 by the first and second fused sealing layers 121 and 131, which may be formed by fusing an inner a first portion of the first sealing layer 101a and an inner a second portion of the second sealing layer 102a. For example, the first fused sealing layer 121 may be disposed between the third gas blocking layer 122 and the internal area 105, at the right edge portion of the electrochemical cell 200. For example, the second fused sealing layer 131 may be disposed between the third gas blocking layer 132 and the internal area 105, at the left edge portion of the electrochemical cell 200. By including the first and second fused sealing layers 121 and 131 and the third gas blocking layers 122 and 132, the internal area 105 may be protected or blocked from gaseous molecules and/or moisture of external environments.

Referring to FIGS. 1 and 2, the amount of the nanostructures in the third gas blocking layers 122 and 132 of the electrochemical cell 200 may be in the range of about 1 weight percent (wt %) to about 99 wt %, about 2 wt % to about 95 wt %, or about 4 wt % to about 90 wt %, with respect to the total weight of the third gas blocking layers 122 and 132. For example, the amount of the nanostructures in the third gas blocking layers 122 and 132 may be in the range of about 5 wt % to about 90 wt % with respect to the total weight of the third gas blocking layers 122 and 132. However, the amount of the nanostructures is not limited to the above ranges and may be appropriately adjusted to within a range that provides improved gas blocking characteristics.

Referring to FIGS. 1 and 2, in the electrochemical cell 200, the thickness of the third gas blocking layers 122 and 132 may be in the range of about 0.2 micrometers ($\mu$m) to about 400 $\mu$m. However, the thickness of the third gas blocking layers 122 and 132 is not limited to the range described above and may be appropriately selected from ranges that may provide a low gas transmission rate and/or a low moisture transmission rate according to the standard of desired batteries. For example, the thickness of the third gas blocking layers 122 and 132 may be in the range of about 2 $\mu$m to about 400 $\mu$m. For example, the thickness of the third gas blocking layers 122 and 132 may be in the range of about 2 $\mu$m to about 200 $\mu$m. For example, the thickness of the third gas blocking layers 122 and 132 may be in the range of about 10 $\mu$m to about 100 $\mu$m. For example, the thickness of the third gas blocking layers 122 and 132 may be in the range of about 10 $\mu$m to about 80 $\mu$m.

Referring to FIGS. 1 and 2, in the electrochemical cell 200, a width between a first end of the third gas blocking layer 122 (or 132) contacting the outside and a second end thereof contacting the first fused sealing layer 121 (or the second fused sealing layer 131) may be in the range of about 0.1 millimeter (mm) to about 30 mm. However, the width therebetween is not limited to the above range and may be appropriately selected from ranges that may provide a low gas transmission rate and/or a low moisture transmission rate as desired. For example, the width of the third gas blocking layers 122 and 132 may be in the range of about 0.1 mm to about 30 mm. For example, the width of the third gas blocking layers 122 and 132 may be in the range of about 0.5 mm to about 20 mm. For example, the width of the third gas blocking layers 122 and 132 may be in the range of about 1 mm to about 10 mm. For example, the width of the third gas blocking layers 122 and 132 may be in the range of about 1 mm to about 5 mm.

Referring to FIGS. 1 and 2, in the electrochemical cell 200, the nanostructures 140 may be one-dimensional nanostructures, two-dimensional nanostructures, or three-dimensional nanostructures. For example, in the electrochemical cell 200, the nanostructures 140 may be two-dimensional nanostructures.

The term "one-dimensional nanostructures" as used herein refers to structures confined to the nanoscale in two dimensions. For example, the one-dimensional nanostructures have a size of about 0.1 nanometer (nm) to about 100 nm in two dimensions and a significantly larger size in the other dimension. Examples of the one-dimensional nanostructures include nanotubes, nanowires, and the like. The term "two-dimensional nanostructures" as used herein refers to structures confined to the nanoscale in one dimension. For example, the two-dimensional nanostructures have a size of about 0.1 nm to about 100 nm in one dimension and a significantly larger size in the other dimensions. Examples of the two-dimensional nanostructures include nanoplates, nanosheets, and the like. The term "three-dimensional nanostructures" as used herein refers to structures confined to the nanoscale in three dimensions. For example, the three-dimensional nanostructures may have a size of about 0.1 nm to about 100 nm in three dimensions. The three-dimensional nanostructures may be, for example, nanoparticles, or the like. An aspect ratio of the nanostructures may be about 1:2 to about 1:1,000,000, about 1:4 to about 1:100,000, or about 1:8 to about 1:10,000. Also, the nanostructures may have any suitable particle size, e.g., about 10 nm to about 10 μm, or about 100 nm to 1 μm. The particle size may be determined by light scattering.

Referring to FIGS. 1 and 2, in the electrochemical cell 200, the nanostructures 140 may include a carbonaceous material. A carbonaceous material has a lower density than a non-carbonaceous inorganic material such as a metal oxide and thus may provide improved energy density of an electrochemical cell. The nanostructures 140 may include at least one material selected from graphene, carbon nanotubes, carbon nanowires, carbon nanobelts, fullerene, and graphite. However, the material of the nanostructures 140 is not limited to the above examples and any suitable carbonaceous material, including those used in the art, may be used.

For example, the nanostructures 140 may include exfoliated graphene. The exfoliated graphene including a plurality of graphene layers may have an interspacing d002 of about 0.35 nm to about 1.2 nm. For example, the interspacing d002 of the exfoliated graphene including a plurality of graphene layers may be in the range of about 0.35 nm to about 0.7 nm. For example, the interspacing d002 of the exfoliated graphene including a plurality of graphene layers may be in the range of about 0.35 nm to about 0.5 nm. The gas blocking characteristics of the third gas blocking layers 122 and 132 may be adjusted by adjusting the interspacing d002 of the exfoliated graphene.

For example, the nanostructures 140 may include graphene oxide, reduced graphene oxide, modified graphene oxide, or the like. However, the material of the nanostructures 140 is not limited to the above examples and any suitable carbonaceous material, including those available in the art for forming the nanostructures 140, may be used. The reduced graphene oxide may be formed by chemically reducing graphene oxide using a reducing agent such as hydrazine, $NaBH_4$, or the like or by thermally reducing graphene oxide through a heat treatment at a high temperature, e.g., about 300° C. to about 1000° C. According to a degree to which graphene oxide is reduced, the interspacing of graphene layers may be adjusted. For example, the higher the temperature, the smaller the interspacing of graphene layers. The modified graphene oxide may include a deformed graphene oxide. Non-limiting examples of a material for forming the nanostructures 140 include a wrinkled graphene oxide and a crumpled graphene oxide. However, the material of the nanostructures 140 is not limited to the above examples and any suitable modified graphene oxide, such as those used in the art for the nanostructures 140 may be used.

Referring to FIGS. 1 and 2, in the electrochemical cell 200, the nanostructures 140 may include a non-carbonaceous inorganic material. For example, the nanostructures 140 may include a layered clay. For example, the nanostructures 140 may include at least one selected from an organized layered clay, intercalated layered clay, and exfoliated layered clay, or the like. The organized layered clays may be a layered clay mineral organized with the organizing agent, for example. For example, the nanostructures 140 may include at least one selected from montmorillonite, bentonite, kaolinite, mica, hectorite, fluorohectorite, saponite, beidelite, nontronite, stevensite, vermiculite, hallosite, volkonskoite, suconite, magadite, and kenyalite. However, the material of the nanostructures 140 is not limited to the above examples and any suitable non-carbonaceous inorganic material, including those used in the art for nanostructures, may be used.

For example, the nanostructures 140 may include a metal oxide. Examples of the metal oxide include at least one selected from titanium dioxide ($TiO_2$), tin dioxide ($SnO_2$), alumina ($Al_2O_3$), zinc oxide (ZnO), and silica ($SiO_2$). However, the metal oxide of the nanostructures 140 is not limited to the above examples and any suitable metal oxide, including those used in the art for nanostructures may be used. For example, the nanostructures 140 may be metal oxide nanoparticles. The metal oxide may have insulating properties.

Referring to FIGS. 1 and 2, in the electrochemical cell 200, the third gas blocking layers 122 and 132 may be a composite layer including a polymer and the nanostructures 140. Since the third gas blocking layers 122 and 132 include a composite layer of a polymer and the nanostructures 140, the internal area 105 may be effectively protected or blocked from gaseous molecules and/or moisture.

The third gas blocking layers 122 and 132 may include the nanostructures 140 that are non-periodically arranged. In the composite layer, the nanostructures 140 may be randomly arranged without a certain periodicity. For example, in the third gas blocking layers 122 and 132, the nanostructures 140 may be spaced from one another by irregular intervals. The third gas blocking layers 122 and 132 include a tortuous path formed by the interspacing of the nanostructures 140 spaced from one another and thus have barrier properties. The nanostructures 140 may be two-dimensional nanostructures.

The polymer included in the third gas blocking layers 122 and 132 may be a polyolefin-based thermoplastic resin. Examples of the polymer included in the third gas blocking layers 122 and 132 include at least one selected from polyethylene (PE), polypropylene (PP), polystyrene (PS), polyvinyl chloride (PVC), acrylonitrile-butadiene-styrene (ABS), and polycarbonate (PC). However, the polymer of the third gas blocking layers 122 and 132 is not limited to the above examples and any suitable thermoplastic resin, including those used in the art, may be used. For example, the polymer included in the third gas blocking layers 122 and 132 may be PE or PP, taking the stability of polymer used with respect to the electrolyte 30 into consideration.

Referring to FIGS. 1 and 2, in the electrochemical cell 200, at least one of the first sealing layer 101a and the second sealing layer 102a may include the nanostructures 140 that are non-conductive. Since the electrode assembly 10 and the electrolyte 30 are accommodated in the internal area 105 of the electrochemical cell 200, the first and second sealing layers 101a and 102a, which surround the internal area 105, are desirably non-conductive to prevent a short circuit between the electrode assembly 10 and the electrolyte 30. Thus, the nanostructures 140 included in the first sealing layer 101a and/or the second sealing layer 102a may be non-conductive. The non-conductive nanostructures 140 may be the non-carbonaceous inorganic nanostructures described above. In addition, at least one of the first and second fused sealing layers 121 and 131 may include the non-conductive nanostructures 140.

Referring to FIGS. 1 and 2, the first and second sealing layers 101a and 102a may have a thickness of about 0.1 μm to about 200 μm. However, the thickness thereof is not limited to the range described above and may be appropriately selected from ranges that may provide a low gas transmission rate and/or a low moisture transmission rate according to the standard of batteries required. For example, the thickness of the first and second sealing layers 101a and 102a may be in the range of about 1 µm to about 200 µm. For example, the thickness of the first and second sealing layers 101a and 102a may be in the range of about 1 µm to about 100 µm. For example, the thickness of the first and second sealing layers 101a and 102a may be in the range of about 5 µm to about 50 µm. For example, the thickness of the first and second sealing layers 101a and 102a may be in the range of about 5 µm to about 40 µm.

Referring to FIGS. 1 and 2, at least one of the first and second gas blocking layers 101b and 102b may include at least one material selected from a metal, metal oxide, polymer, and a carbonaceous material. However, the material of the first and second gas blocking layers 101b and 102b are not limited to the above examples and any suitable material, including those used in the art, with a suitable gas transmission rate and/or a suitable moisture transmission rate may be used. By including at least one material selected from the metal, metal oxide, polymer, and the carbonaceous material, the first gas blocking layer 101b and/or the second gas blocking layer 102b have a water vapor transmission rate (WVTR) or an oxygen transmission rate (OTR) that is equal to or less than one fifth that of the first and second sealing layers 101a and 102a.

The metal included in the first and second gas blocking layers 101b and 102b may be at least one selected from aluminum, stainless steel, and nickel. However, the metal is not limited to the above examples and any suitable metal with gas blocking properties, including those used in the art, may be used. For example, when a metal layer includes iron-including aluminum, the metal layer may have improved insulating properties undergoes less formation of pinholes due to bending. Further, when forming the housing, the metal layer may enable sidewalls thereof to be easily formed. For example, at least one of the first and second gas blocking layers 101b and 102b may be a metal layer. The metal layer may have an uneven portion formed by embossing or the like. The first gas blocking layer 101b and/or the second gas blocking layer 102b may be a metal layer, e.g., thin metal foil. The metal layer may be formed by deposition or sputtering.

The metal oxide included in the first and second gas blocking layers 101b and 102b may comprise at least one selected from $TiO_2$, $SnO_2$, $Al_2O_3$, ZnO, and $SiO_2$, but is not limited to the above examples. For example, any suitable metal oxide with gas blocking properties, including those used in the art, may be used. For example, at least one of the first and second gas blocking layers 101b and 102b may be a metal oxide layer. The metal oxide layer may be formed using a sol-gel method. The metal oxide layer may have insulating properties.

The polymer included in the first and second gas blocking layers 101b and 102b may comprise at least one selected from a polyketone, fluoropolymer, polyvinylidene chloride (PVDC), ethylene vinyl alcohol (EVOH), and liquid crystal polymer (LCP), but is limited to the examples described above. For example, any suitable polymer with gas blocking properties, including those used in the art, may be used. For example, at least one of the first and second gas blocking layers 101b and 102b may be a polymer layer. The polymer layer may be formed using a coating method.

The carbonaceous material included in the first and second gas blocking layers 101b and 102b may comprise at least one selected from graphite, carbon nanotubes, graphene, and carbon fibers, but is not limited to the examples described above. For example, any suitable carbonaceous material with gas blocking properties, including those used in the art, may be used. For example, at least one of the first and second gas blocking layers 101b and 102b may be a carbonaceous material layer. For example, the carbonaceous material layer may be a graphite sheet.

Referring to FIGS. 1 and 2, in the electrochemical cell 200, at least one of the first and second gas blocking layers 101b and 102b may have a multilayer structure including a plurality of layers. For example, the first gas blocking layer 101b and/or the second gas blocking layer 102b may be a laminate of multiple metal layers. For example, the first gas blocking layer 101b and/or the second gas blocking layer 102b may comprise a laminate of multiple polymer layers. For example, the first gas blocking layer 101b and/or the second gas blocking layer 102b may comprise a carbonaceous material layer having a multilayer structure in which polymer layers are disposed on opposite surfaces of a carbon sheet. For example, the carbonaceous material layer may have a structure including three layers, e.g., a polypropylene layer/graphite sheet/nylon layer structure.

Referring to FIGS. 1 and 2, in the electrochemical cell 200, the thickness of the first and second gas blocking layers 101b and 102b may be in the range of about 0.1 µm to about 200 µm, but is not limited to the range described above. That is, the thickness of the first and second gas blocking layers 101b and 102b may be appropriately selected from ranges that may provide a low gas transmission rate and/or a low moisture transmission rate as desired. For example, the thickness of the first and second gas blocking layers 101b and 102b may be in the range of about 1 µm to about 200 µm. For example, the thickness of the first and second gas blocking layers 101b and 102b may be in the range of about 1 µm to about 100 µm. For example, the thickness of the first and second gas blocking layers 101b and 102b may be in the range of about 5 µm to about 50 µm.

Referring to FIGS. 1 and 2, in the electrochemical cell 200, the first sheet 101 may further include the first external insulating layer 101c and the second sheet 102 may further include the second external insulating layer 102c. Since the first and second sheets 101 and 102 further include the first and second external insulating layers 101c and 102c, respectively, the internal area 105 may be effectively protected or blocked from gaseous molecules and/or moisture of external environments.

The first external insulating layer 101c and/or the second external insulating layer 102c may include a polymer. The polymer may be selected from polyesters, polycarbonates, and polyamides. Examples of polyesters include polyethylene terephthalate (PET), polybutylene terephthalate (PBT), polyethylene naphthalate (PEN), and polybutylene naphthalate (PBN). Examples of polyamides include nylon 6, nylon 6,6, a copolymer of nylon 6 and nylon-6,6, nylon-6,10, and poly(meta-xylene adipamide) (MXD 6).

Referring to FIGS. 1 and 2, in the electrochemical cell 200, the first and second external insulating layers 101c and 102c may have a thickness of about 0.1 µm to about 200 µm, but the thickness thereof is not limited to the range described above. For example, the thickness of the first and second external insulating layers 101c and 102c may be appropriately selected from ranges that may provide a low gas transmission rate and/or a low moisture transmission rate as desired. For example, the thickness of the first and second external insulating layers 101c and 102c may be in the range of about 1 µm to about 200 µm. For example, the thickness of the first and second external insulating layers 101c and 102c may be in the range of about 1 µm to about 100 µm. For example, the thickness of the first and second external insulating layers 101c and 102c may be in the range of about 5 µm to about 50 µm.

Referring to FIGS. 1 and 2, in the electrochemical cell 200, the first and second sheets 101 and 102 may have a thickness of about 0.5 μm to about 500 μm, but the thickness thereof is not limited to the range described above. For example, the thickness of the first and second sheets 101 and 102 may be appropriately selected from ranges that may provide a low gas transmission rate and/or a low moisture transmission rate as desired. For example, the thickness of the first and second sheets 101 and 102 may be in the range of about 1 μm to about 400 μm. For example, the thickness of the first and second sheets 101 and 102 may be in the range of about 1 μm to about 300 μm. For example, the thickness of the first and second sheets 101 and 102 may be in the range of about 5 μm to about 200 μm.

Referring to FIGS. 1 and 2, in the electrochemical cell 200, at least one of the first and second sheets 101 and 102 may be flexible and/or elastic. A flexibility of the first and second sheets may each independently be about 0.01 to about 3 gigaPascals (GPa), about 0.05 to about 2.5 GPa, or about 0.1 to about 1 GPa. Thus, the electrochemical cell 200 may have suitable flexibility or elasticity. Accordingly, the electrochemical cell 200 may have suitable durability for repeated bending.

Figure 3:
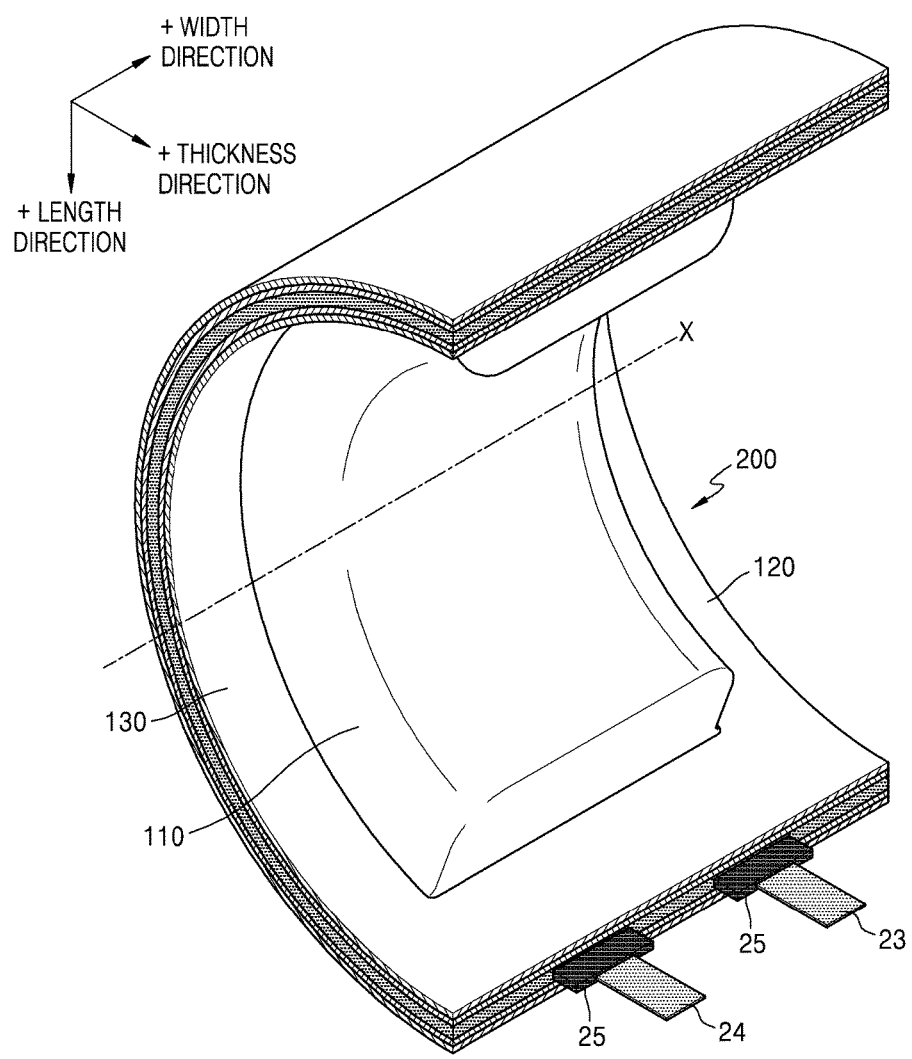
FIG. 3 is a schematic perspective view illustrating the structure of the electrochemical cell of FIG. 1.

Referring to FIGS. 1 to 3, in the electrochemical cell 200, the first and second sheets 101 and 102 may have a multilayer structure including at least three layers. For example, the first and second sheets 101 and 102 may have a structure in which sealing layers, gas blocking layers, and external insulating layers are alternately arranged. For example, the first and second sheets 101 and 102 may further include other layers between a sealing layer and a gas blocking layer and an external insulating layer. For example, the first and second sheets 101 and 102 may further include an adhesive layer between at least two layers selected from a sealing layer, a gas blocking layer, and an external insulating layer. By including such an adhesive layer, adhesive strength between the layers described above may become stronger.

Referring to FIGS. 1 to 3, the electrochemical cell 200 and the electrode assembly 10 may have a length direction, a thickness direction, and a width direction defined as three directions that are perpendicular to one another. For example, in FIG. 0.1, a horizontal direction may be defined as the width direction, a vertical direction may be defined as the thickness direction, and a direction penetrating the drawing may be defined as the length direction. The electrochemical cell 200 may be configured such that the length thereof is greater than the width thereof. In this regard, when the electrochemical cell 200 is bent, the directions described above may vary according to the position of the electrochemical cell 200. For example, as illustrated in FIG. 3, in an embodiment in which the electrochemical cell 200 is bent in a direction towards an axis of the width direction, the width direction is constant at all positions of the electrochemical cell 200, while the length and thickness directions may continuously vary according to the positions thereof. In this regard, the length direction may be defined as a tangential direction contacting a curved surface at each position of the electrochemical cell 200, and the thickness direction may be defined as a direction extending perpendicular to the tangential direction towards the curvature center of the curved surface.

The electrochemical cell 200 can have any suitable shape, and can have any desired number of sides. For example, electrochemical cell 200 may be rectangular and have four sides, as disclosed above, or may be pentagonal, hexagonal, septagonal, or octagonal, for example.

Alternatively, the electrochemical cell 200 may have a curvilinear shape, for example the electrochemical cell may be cylindrical, and may have a circular, oval, or stadium shaped cross-section.

FIG. 3 is a schematic perspective view illustrating the structure of the electrochemical cell 200 of FIG. 1. Referring to FIG. 3, the electrochemical cell 200 may extend in the length direction. That is, the length of the electrochemical cell 200 may be greater than the width thereof. In addition, the electrochemical cell 200 may include first and second lead tabs 23 and 24 extending in the length direction or the width direction and out of a first end portion thereof. The first and second lead tabs 23 and 24 may be electrically connected to the electrode assembly 10 accommodated in the accommodation part 110 and may extend from between the first sheet 101 and the second sheet 102. To completely seal a region of the first and second sheets 101 and 102 in which the first and second lead tabs 23 and 24 are arranged, each of the first and second lead tabs 23 and 24 may further include a sealing member 25 at a middle part thereof. The sealing member 25 may comprise, for example, a thermoplastic material such as polyethylene or polypropylene and may be bonded with the first and second sealing layers 101*a* and 102*a*.

As illustrated in FIG. 3, the electrochemical cell 200 may be configured so as to bend towards an axis X of the width direction. Although FIG. 3 illustrates that the electrochemical cell 200 is entirely bent in the length direction, the electrochemical cell 200 may be partially bent in the length direction, towards the axis X of the width direction. As the electrochemical cell 200 is bent, the first and second bonded members 120 and 130 may also be bent towards the axis X of the width direction. FIGS. 1 and 5 to 11 are cross-sectional views taken along the axis X of the width direction of FIG. 3.

Figure 4:
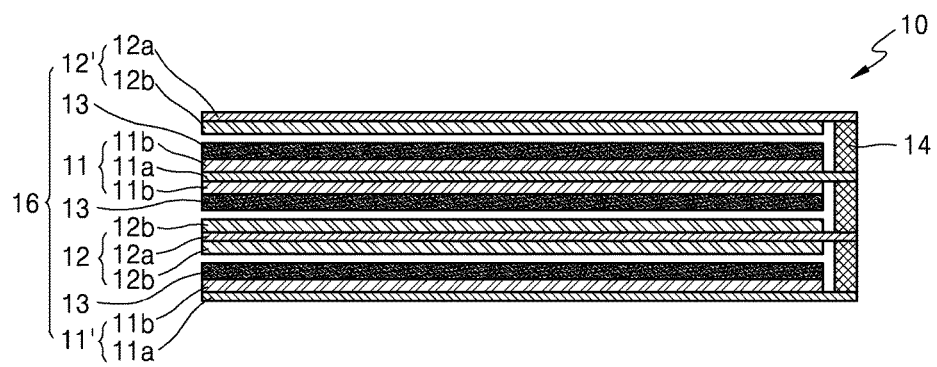
FIG. 4 is a schematic cross-sectional view illustrating a structure of an electrode assembly included in the electrochemical cell of FIG. 1.

Referring to FIG. 4, the electrode assembly 10 may include a stacked electrode structure 16 and a binding member 14 to bind a first end portion of the stacked electrode structure 16. The stacked electrode structure 16 may have a structure in which a plurality of first electrode plates 11 and 11', a plurality of separators 13, and a plurality of second electrode plates 12 and 12' are disposed on one another, e.g., stacked. For example, the stacked electrode structure 16 may include the first electrode plates 11 and 11' and the second electrode plates 12 and 12' that are alternately stacked, and the separators 13 between the first electrode plates 11 and 11' and the second electrode plates 12 and 12'. In this regard, the separators 13 may be bonded to the first electrode plates 11 and 11'. The first electrode plates 11 and 11', the second electrode plates 12 and 12', and the separators 13 may comprise a flexible sheet and accordingly, the stacked electrode structure 16 may be flexible.

The first electrode plates 11 and 11' may include a first current collector 11*a* and a first electrode active material layer 11*b* disposed on, e.g., formed on, a surface of the first current collector 11*a*. In this regard, in the first electrode plate 11 formed on an inner side of the stacked electrode structure 16, the first electrode active material layers 11*b* may be disposed on opposite surfaces of the first current collector 11*a*, and in the first electrode plate 11' formed on an outer side of the stacked electrode structure 16, the first electrode active material layer 11*b* may be disposed only on one surface of the first current collector 11*a*. The second electrode plates 12 and 12' may include a second current collector 12*a* and a second electrode active material layer 12*b* disposed on a surface of the second current collector 12*a*. In this regard, in the second electrode plate 12 disposed on an inner side of the stacked electrode structure 16, the second electrode active material layers 12*b* may be formed on opposite surfaces of the second current collector 12*a*, and in the second electrode plate 12' disposed on an outer side of the stacked electrode structure 16, the second electrode active material layer 12*b* may be disposed only on one surface of the second current collector 12*a*.

Any one of the first electrode plates 11 and 11' and the second electrode plates 12 and 12' may be cathode plates and the other thereof may be anode plates. For example, when the first electrode plates 11 and 11' are cathode plates, the second electrode plates 12 and 12' may be anode plates. In addition, when the first electrode plates 11 and 11' are anode plates, the second electrode plates 12 and 12' may be cathode plates. When the first electrode plates 11 and 11' are cathode plates and the second electrode plates 12 and 12' are anode plates, the first current collector 11*a* may be a cathode current collector and the first electrode active material layer 11*b* may be a cathode active material layer. In addition, the second current collector 12*a* may be an anode current collector and the second electrode active material layer 12*b* may be an anode active material layer.

The binding member 14 may be arranged on the first end portion of the stacked electrode structure 16. The first end portion of the stacked electrode structure 16 may be fixed by the binding member 14. Examples of the binding member 14 include an adhesive, a tape coated with an adhesive, and the like, but various other binding members may also be used. Since the first end portion of the stacked electrode structure 16 is fixed by the binding member 14, the first electrode plates 11 and 11', the separators 13, and the second electrode plates 12 and 12' maintain alignment for a reversible electrochemical reaction even when the electrode assembly 10 is deformed by bending. The binding member 14 may be omitted. When the binding member 14 is not used, the stacked electrode structure 16 corresponds to the electrode assembly 10.

Figure 5:
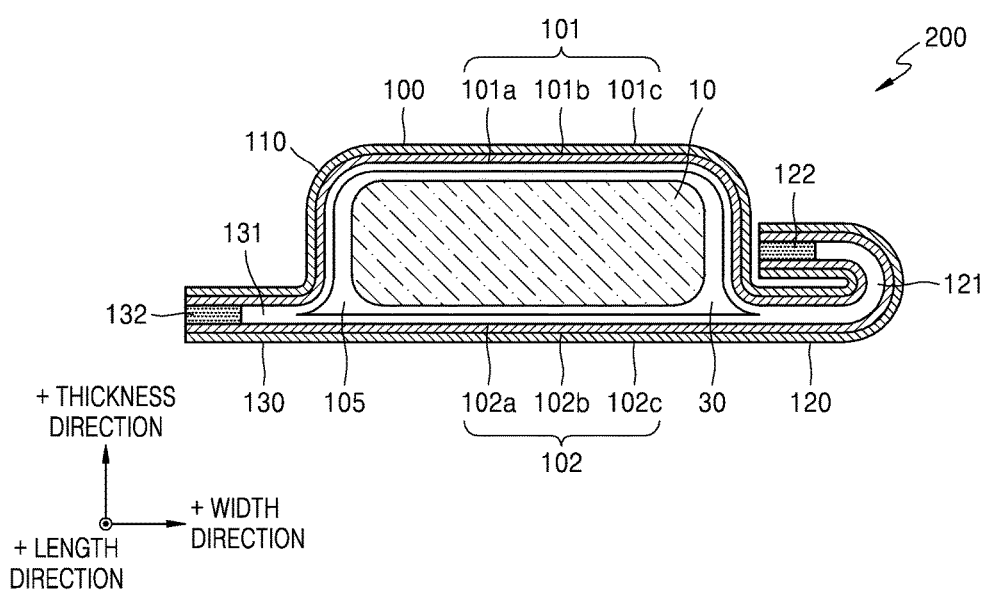
FIGS. 5, 6, 7, 8, 9, 10, and 11 are schematic cross-sectional views illustrating structures of electrochemical cells according to other embodiments.
Figure 6:
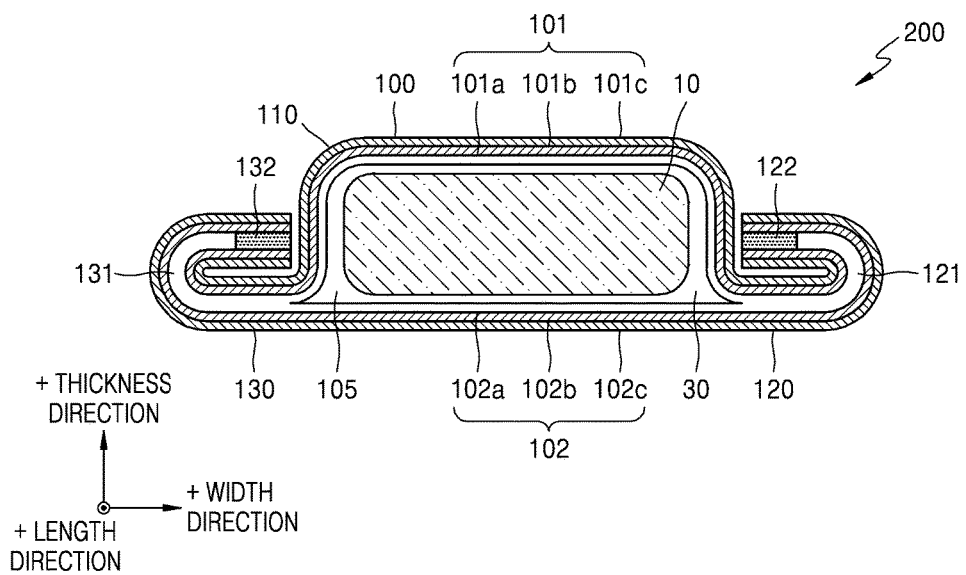

Referring to FIGS. 5 and 6, at least one of the first and second bonded members 120 and 130 may be bent at an angle of 180° towards the accommodation part 110. Thus, a path through which gases and/or moisture permeates into the internal area 105 becomes longer and accordingly, the internal area 105 may be effectively protected or blocked from gaseous molecules and/or moisture of external environments. In addition, in an electrochemical module including a plurality of the electrochemical cells 200, an empty space between the second bonded members 130 of the electrochemical cells 200 decreases and thus an energy density per unit volume of the electrochemical module may be enhanced. In another embodiment, although not shown in the drawing, at least one of the first and second bonded members 120 and 130 may be bent at 90° towards the accommodation part 110.

Figure 7:
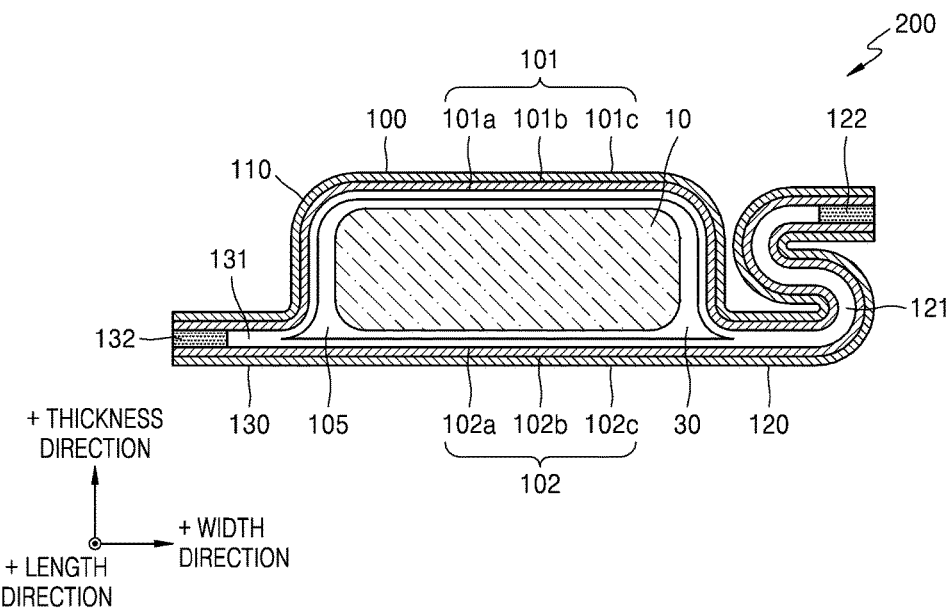
Figure 8:
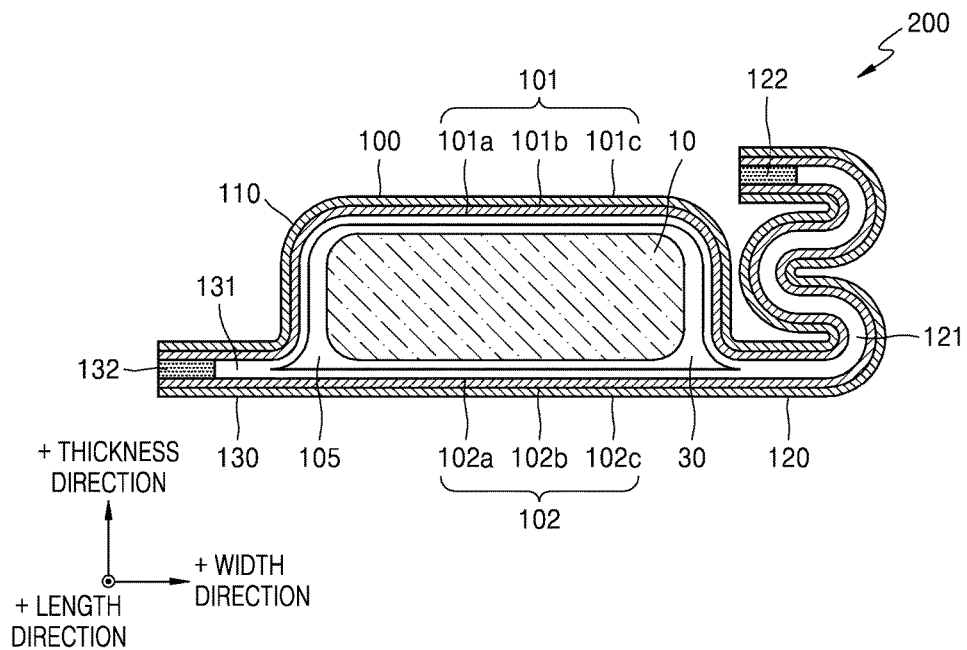

Referring to FIGS. 7 and 8, at least one of the first and second bonded members 120 and 130 may be repeatedly bent at 180° towards and away from the accommodation part 110. By this configuration, a path through which gases and/or moisture permeates into the internal area 105 becomes longer and accordingly, the internal area 105 may be effectively protected or blocked from gaseous molecules and/or moisture of external environments. In addition, in an electrochemical module including a plurality of the electrochemical cells 200, an empty space between the second bonded member 130 of the electrochemical cells 200 decreases and thus an energy density per unit volume of the electrochemical module may be enhanced. For example, referring to FIG. 7, the first bonded member 120 of the electrochemical cell 200 may be bent at 180° once towards the accommodation part 110 and once apart therefrom. For example, referring to FIG. 8, the first bonded member 120 of the electrochemical cell 200 may be bent at 180° once towards the accommodation part 110, once away from the accommodation part 110, and once towards the accommodation part 110.

Figure 9:
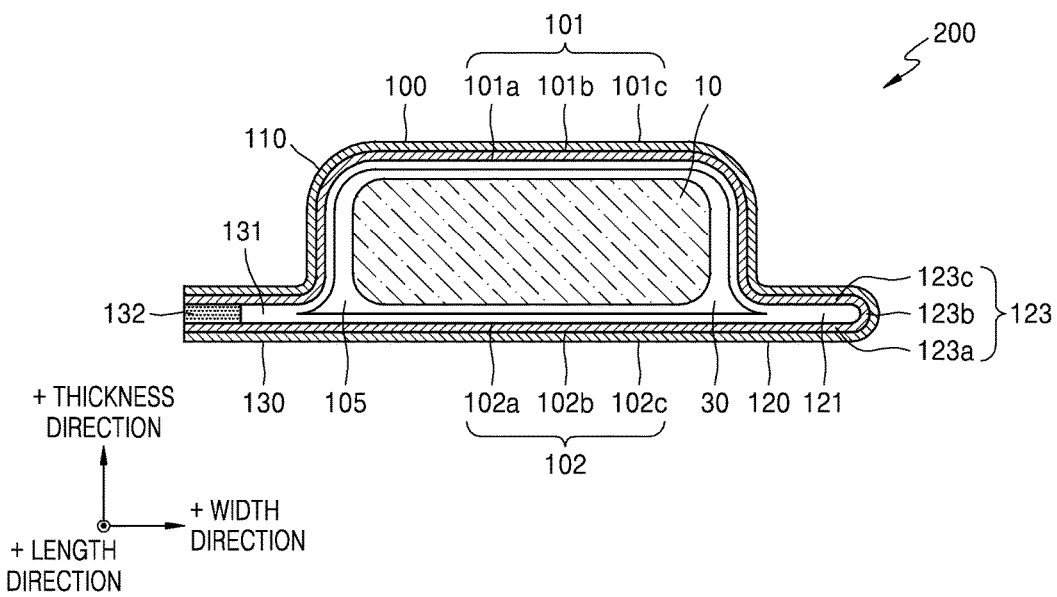
Figure 10:
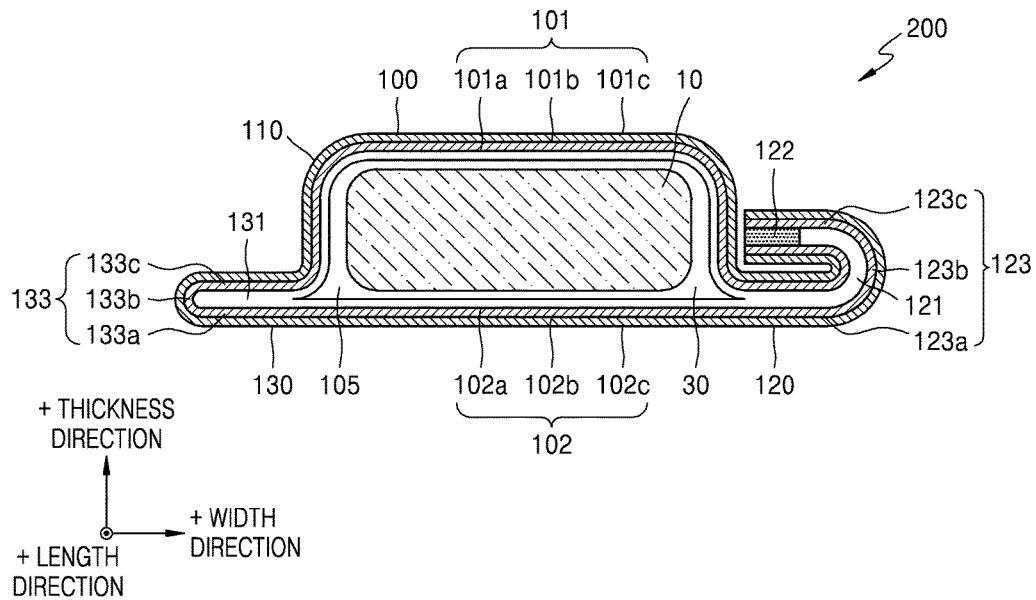

Referring to FIGS. 9 and 10, at least one of the first bonded member 120 and the second bonded member 130 may further include a fourth gas blocking layer, e.g., fourth gas blocking layers 123 and 133 respectively contacting the third gas blocking layers 122 and 132 or the first and second fused sealing layers 121 and 131. The fourth gas blocking layers 123 and 133 correspond to a structure in which the first and second gas blocking layers 101*b* and 102*b* are bent so as to face each other and be connected to each other. Accordingly, the first and second sheets 101 and 102 of the electrochemical cell 200 form the housing 100 that is substantially integrally formed.

Referring to FIGS. 9 and 10, the fourth gas blocking layers 123 and 133 may respectively include lower and upper portions 123*a* and 123*c* and lower and upper portions 133*a* and 133*c* that are respectively parallel to the first and second fused sealing layers 121 and 131 and positioned at different heights, and middle portions 123*b* and 133*b* that continuously extend between the lower and upper portions 123*a* and 123*c* and between the lower and upper portions 133*a* and 133*c*, respectively and that are bent so as to surround first ends of the third gas blocking layers 122 and 132 or the first and second fused sealing layers 121 and 131.

Figure 11:
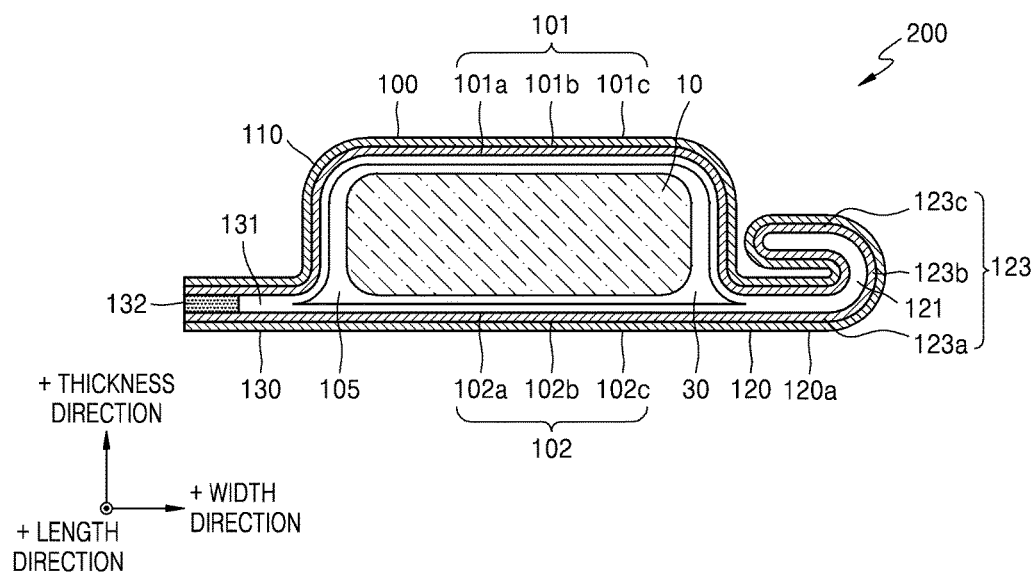

Referring to FIGS. 10 and 11, in the electrochemical cell 200 including at least one of the fourth gas blocking layers 123 and 133, at least one of the first bonded member 120 and the second bonded member 130 may be bent at 180° towards the accommodation part 110. By this configuration, a path through which gases and/or moisture permeates into the internal area 105 becomes longer and thus the internal area 105 may be effectively protected or blocked from gaseous molecules and/or moisture of external environments. In addition, in an electrochemical module including a plurality of the electrochemical cells 200, an empty space between the second bonded member 130 of the electrochemical cells 200 decreases and thus an energy density per unit volume of the electrochemical module may be enhanced.

Referring to FIG. 4, in the electrode assembly 10, the first and second electrode active material layers 11*b* and 12*b* of the first electrode plates 11 and 11' and the second electrode plates 12 and 12' include an electrode active material. The first and second electrode active material layers 11*b* and 12*b* may further include at least one of a conductive agent, a binder, and a plasticizer.

The first and second electrode active material layers 11*b* and 12*b* may include a cathode active material. Any suitable cathode active material including those used in the art as a cathode active material for secondary batteries may be used. The cathode active material may be a lithium-containing metal oxide.

For example, the cathode active material may be at least one selected from composite oxides of lithium and a metal selected from cobalt, manganese, nickel, and combinations thereof. For example, the cathode active material may be a compound represented by any one of Formulae: $Li_aA_{1-b}B'_bD_2$ where $0.90 \leq a \leq 1$ and $0 \leq b \leq 0.5$; $Li_aE_{1-b}B'_bO_{2-c}D_c$ where $0.90 \leq a \leq 1$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bB'_cO_{2-\alpha}F''_2$ where $0.90 \leq a \leq 1$, $0 \leq b \leq 0.5$, $0 \leq c \leq 0.05$, and $0 < \alpha \leq 2$; $Li_aNi_{1-b-c}Mn_bB'_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Mn_bB'_cO_{2-\alpha}F''_\alpha$ where $0.90 \leq a \leq 1$, $0 \leq b \leq 0.5$, $0 \leq c \leq 0.05$, and $0 < \alpha < 2$; $Li_aNi_{1-b-c}Mn_bB'_cO_{2-\alpha}F''_2$ where $0.90 \leq a \leq 1$, $0 \leq b \leq 0.5$, $0 \leq c \leq 0.05$, and $0 < \alpha < 2$; $Li_aNi_bE_cG_dO_2$ where $0.90 \leq a \leq 1$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1$ and $0.001 \leq b \leq 0.1$; $Li_aCoG_bO_2$ wherein $0.90 \leq a \leq 1$ and $0.001 \leq b \leq 0.1$; $Li_aMnG_bO_2$ where $0.90 \leq a \leq 1$ and $0.001 \leq b \leq 0.1$; $Li_aMn_2G_bO_4$ where $0.90 \leq a \leq 1$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is at least one selected from nickel (Ni), cobalt (Co), and manganese (Mn); B' is at least one selected from aluminum (Al), Ni, Co, Mn, chromium (Cr), iron (Fe), magnesium (Mg), strontium (Sr), vanadium (V), and a rare earth element; D is at least one selected from oxygen (O), fluorine (F), sulfur (S), and phosphorus (P); E is at least one selected from Co, and Mn; F' is at least one selected from F, S, and P; G is at least one selected from Al, Cr, Mn, Fe, Mg, lanthanum (La), cerium (Ce), Sr, and V; Q is at least one selected from titanium (Ti), molybdenum (Mo), and Mn; I' is at least one selected from Cr, V, Fe, scandium (Sc), and yttrium (Y); and J is at least one selected from V, Cr, Mn, Co, Ni, and copper (Cu).

The cathode active materials represented by Formulae above may further have a coating layer on their surfaces. The coating layer may include a coating element compound, such as an oxide of a coating element, a hydroxide of a coating element, an oxyhydroxide of a coating element, an oxycarbonate of a coating element, or a hydroxycarbonate of a coating element. The coating element compounds may be amorphous or crystalline. The coating element included in the coating layer may be at least one selected from Mg, Al, Co, potassium (K), sodium (Na), calcium (Ca), silicon (Si), Ti, V, tin (Sn), germanium (Ge), gallium (Ga), boron (B), arsenic (As), and zirconium (Zr). In addition, a cathode active material layer may include a mixture of a cathode active material represented by one of the formulae above and having no coating layer and a cathode active material represented by one of the formulae above and further including a coating layer.

The first and second electrode active material layers 11b and 12b may include, for example, at least one selected from $LiNiO_2$, $LiCoO_2$, $LiMn_xO_{2x}$ where x=1 or 2, $LiNi_{1-x}Mn_xO_2$ where $0<x<1$, $LiNi_{1-x-y}Co_xMn_yO_2$ where $0 \leq x \leq 0.5$ and $0 \leq y \leq 0.5$, $LiFePO_4$, $LiFeO_2$, $V_2O_5$, TiS, and MoS.

In another embodiment, the first and second electrode active material layers 11b and 12b may include an anode active material. Any suitable anode active material including those used in the art as an anode active material for secondary batteries may be used. The anode active material may be at least one selected from lithium metal, a metal alloyable with lithium, a transition metal oxide, a non-transition metal oxide, and a carbonaceous material.

Examples of the metal alloyable with lithium include at least one selected from Si, Sn, Al, Ge, lead (Pb), bismuth (Bi), antimony (Sb), an Si—Y' alloy wherein Y' is an alkali metal, an alkaline earth metal, a Group 13 element, a Group 14 element, a transition metal, and a rare earth element (except for Si), an Sn—Y" alloy wherein Y" is at least one selected from an alkali metal, an alkaline earth metal, a Group 13 element, a Group 14 element, a transition metal, and a rare earth element (except for Si). Y' and Y" may each independently be at least one selected from Mg, Ca, Sr, barium (Ba), radium (Ra), Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, indium (In), Ti, Ge, P, As, Sb, Bi, S, selenium (Se), tellurium (Te), and polonium (Po).

For example, the transition metal oxide may be a lithium titanium oxide, a vanadium oxide, a lithium vanadium oxide, or the like.

For example, the non-transition metal oxide may be $SnO_2$, $SiO_x$ where $0<x<2$, or the like.

For example, the carbonaceous material may comprise at least one selected from crystalline carbon and amorphous carbon. Examples of the crystalline carbon include natural graphite and artificial graphite that is in amorphous, plate, flake, spherical or fibrous form. Examples of the amorphous carbon include soft carbon (carbon calcined at low temperatures), hard carbon, meso-phase pitch carbides, calcined cokes, and the like.

In addition, the first and second electrode active material layers 11b and 12b may include a conductive agent. Examples of the conductive agent include carbon black, graphite particulates, natural graphite, artificial graphite, acetylene black, Ketjen black, carbon fibers, carbon nanotubes, metallic powders, fibers or tubes formed of copper, nickel, aluminum, silver, or the like, and conductive polymers such as polyphenylene derivatives, but the conductive agent is not limited to the above examples. For example, any suitable conductive material including those used in the art may be used.

In addition, the first and second electrode active material layers 11b and 12b may include a binder. Examples of the binder include a vinylidene fluoride/hexafluoropropylene copolymer, polyvinylidene fluoride, polyacrylonitrile, polymethyl methacrylate, polytetrafluoroethylene (PTFE), mixtures of the polymers described above, and styrene butadiene rubber-based polymers.

Referring to FIG. 4, in an embodiment in which the first electrode plates 11 and 11' are anode plates and the second electrode plates 12 and 12' are cathode plates, the stacked electrode structure 16 may be prepared as follows.

For example, cathode plates 12 and 12' are prepared. A cathode active material composition is prepared by mixing a cathode active material, a conductive agent, a binder, and a solvent together. The cathode active material composition is directly coated onto at least one surface of a current collector 12a, which may comprise aluminum, and dried to manufacture the cathode plates 12 and 12' with the cathode active material layer(s) 12b formed thereon. In another embodiment, the cathode active material composition is cast onto a separate support and a film separated from the support is laminated on at least one surface of the current collector 12a which may comprise aluminum, to manufacture the cathode plates 12 and 12' with the cathode active material layer(s) 12b formed thereon.

The cathode active material, the conductive agent, and the binder used in the manufacture of the cathode plates 12 and 12' may be the same as those used to manufacture the electrode plates described above. The solvent used to manufacture the cathode plates 12 and 12' may be at least one selected from N-methylpyrrolidone (NMP), acetone, water, or the like, but is not limited to the above examples. For example, any suitable solvent including solvents used in the art may be used. In some embodiments, the cathode active material composition may further include a plasticizer to form pores in the cathode plates 12 and 12'.

The amounts of the cathode active material, the conductive agent, the binder, and the solvent used in the manufacture of the cathode plates 12 and 12' are the same levels as those used in general secondary batteries. At least one of the conductive agent, the binder, and the solvent may be omitted if desired. The secondary battery may be a lithium battery.

Next, anode plates 11 and 11' are prepared. The anode plates 11 and 11' may be manufactured using the same method as that used to manufacture the cathode plates 12 and 12', except that an anode active material is used instead of the cathode active material. When preparing an anode active material composition, a conductive agent, a binder, and a solvent that are the same as those used for the cathode plates 12 and 12' may be used.

For example, the anode active material composition is prepared by mixing an anode active material, a conductive agent, a binder, and a solvent together, and the anode active material composition is directly coated onto at least one surface of a Cu current collector to manufacture the anode plates 11 and 11'. In another embodiment, the anode active material composition is cast onto a separate support and an anode active material film separated from the support is laminated on at least one surface of a Cu current collector to manufacture the anode plates 11 and 11'. The amounts of the anode active material, the conductive agent, the binder, and the solvent used to manufacture the anode plates 11 and 11' can be determined by one of skill in the art without undue experimentation and thus are not further elaborated for clarity.

Next, the separators 13 to be disposed between the cathode plates 12 and 12' and the anode plates 11 and 11' are prepared. As the separators 13, any suitable separator including those used in secondary batteries such as lithium batteries may be used. The separator may have low resistance to transfer of ions in an electrolyte and high electrolyte-retaining ability. Examples of the separator include glass fiber, polyester, polyethylene, polypropylene, polytetrafluoroethylene (PTFE), and combinations thereof, each of which may be a nonwoven fabric or a woven fabric. For example, in a lithium ion battery, a windable separator formed of polyethylene, polypropylene, or the like may be used. In a lithium ion polymer battery, a separator having a high ability to retain an organic electrolytic solution may be used.

The separators 13 may be manufactured according to the following method. For example, a separator composition may be prepared by mixing a polymer resin, a filler, and a solvent together. The separator composition may be directly coated onto a cathode plate or an anode plate and dried to form the separator 13. In another embodiment, the separator composition may be cast onto a support and dried and a separator film separated from the support is laminated on an electrode to form the separator 13.

The polymer used to prepare the separator 13 is not particularly limited, and any suitable materials used as binders for a cathode plate or an anode plate may be used. Examples of the polymer include a vinylidene fluoride/hexafluoropropylene copolymer, polyvinylidene fluoride (PVDF), polyacrylonitrile, polymethyl methacrylate, and mixtures thereof, but the polymer resin is not limited to the above examples. For example, any suitable material for forming a separator, including those used in the art, may be used.

Subsequently, the separators 13 are disposed between the cathode plates 12 and 12' and the anode plates 11 and 11' to prepare the stacked electrode structure 16. A first end of the stacked electrode structure 16 is fixed by the binding member 14, thereby completing the manufacture of the electrode assembly 10.

Referring to FIGS. 1 to 4, the electrochemical cell 200 may include the electrode assembly 10 including the stacked electrode structure 16 described above. In the electrode assembly 10, the binding member 14 may be omitted.

Referring to FIGS. 1 to 4, the electrochemical cell 200 may be prepared as follows. For example, the electrochemical cell 200 may be a lithium battery.

First, the stacked electrode structure 16 is prepared as described above.

Next, the electrolyte 30 is prepared. For example, the electrolyte 30 may be an organic electrolytic solution. In some embodiments, the electrolyte 30 may be a solid electrolyte. The solid electrolyte may comprise a boron oxide, lithium oxynitride, or the like, but is not limited to the above examples. For example, any suitable solid electrolyte including those used in the art may be used. The solid electrolyte may be formed on the electrode plate or the separator by sputtering or the like.

For example, an organic electrolytic solution may be prepared as the electrolyte 30. The organic electrolytic solution may be prepared by dissolving a lithium salt in an organic solvent.

Examples of the organic solvent include at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, and dimethyl ether, but the organic solvent is not limited to the above examples. For example, any suitable organic solvent for organic electrolytic solutions, including those that may be used in the art, may be used.

Examples of the lithium salt include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, and LiI, but the lithium salt is not limited to the above examples. For example, any suitable lithium salt including those used in the art may be used.

Referring to FIGS. 1 to 4, the electrochemical cell 200 includes the electrode assembly 10 including the stacked electrode structure 16. The electrode assembly 10 is impregnated with an organic electrolytic solution as the electrolyte 30 and then accommodated in a pouch 100 as a housing, and the resulting structure is sealed, thereby completing the manufacture of the electrochemical cell 200. A plurality of electrochemical cells 200 may be stacked to form a battery pack, and such a battery pack may be used in any kinds of device benefiting from a flexible secondary battery. The electrochemical cell 200 may be used in, for example, wearable devices such as smart watches, and the like. A secondary battery may be an alkali metal battery. For example, the secondary battery may be a lithium secondary battery or a sodium secondary battery.

An embodiment will now be described in further detail with reference to the following examples and comparative examples. However, these examples are for illustrative purposes only and are not intended to limit the scope of the one or more embodiments.

EXAMPLES

Manufacture of Electrode Plate

Example 1: Graphene Nanostructures

Two multilayer sheets (manufactured by Dai Nippon Printing Co., Ltd.) each formed of polypropylene/aluminum/nylon and having an area of 60 millimeters (mm)×70 mm were stacked such that the polypropylene layers faced each other and then three edges of the stacked two multilayer sheets were bonded together by thermal bonding after 3 mm remained on each edge. 1 gram (g) of diethyl carbonate (DEC) was injected between the two multilayer sheets via the non-bonded edge thereof and the non-bonded edge was subjected to thermal bonding to form a fused sealing layer.

Subsequently, graphene powder (manufactured by Cheap tubes Inc.) was uniformly coated between the polypropylene layers positioned on the non-bonded 3 mm edge portions, followed by thermal bonding, to form a gas blocking layer, thereby completing the manufacture of a housing.

Example 2: Clay Nanostructures

A housing was manufactured in the same manner as in Example 1, except that a nanoclay (CLOISITE 15A, manufactured by Southern Clay) was used instead of the graphene powder.

Example 3: Silica Nanostructures

A housing was manufactured in the same manner as in Example 1, except that silica ($SiO_2$) nanoparticles (SI-OX-02-NP, manufactured by American Elements) were used instead of the graphene powder.

Example 4: Graphite Sheet (Used Instead of Al Layer)

A polypropylene sheet, a graphite sheet, and a nylon sheet, each of which had an area of 60 mm×70 mm, were sequentially stacked and then subjected to thermal bonding to form a multilayer sheet consisting of polypropylene/graphite/nylon layers.

Two multilayer sheets, each consisting of polypropylene/graphite/nylon layers, were stacked such that the polypropylene layers faced each other and then three edges of the stacked two multilayer sheets were bonded together by thermal bonding after 3 mm remained on each edge. 1 g of DEC was injected between the two multilayer sheets via the non-bonded edge thereof and the non-bonded edge was subjected to thermal bonding to form a fused sealing layer.

Subsequently, graphene powder (manufactured by Cheap tubes Inc.) was uniformly coated between the polypropylene layers positioned on the non-bonded 3 mm edge portions, followed by thermal bonding, to form a gas blocking layer, thereby completing the manufacture of a housing.

Comparative Example 1

A housing was manufactured in the same manner as in Example 1, except that a gas blocking layer was formed by thermal bonding without using the graphene powder.

Evaluation Example 1: Moisture Transmission Rate Evaluation

The housings manufactured according to Examples 1 to 4 and Comparative Example 1 were put in an isothermal-isohumidity chamber at 60° C. and a relative humidity of 85%, maintained therein for 5 days to 7 days, and then taken out of the chamber, and moisture content in each housing was measured using a Karl-Fischer moisture meter. A part of the measurement results is shown in Table 1 below.

TABLE 1

| Evaluation time | Comparative Example 1 [ppm] | Example 1 [ppm] | Moisture transmission reduction rate [%] |
|---|---|---|---|
| $5^{th}$ day | 103.2 | 79.4 | 23.1 |
| $6^{th}$ day | 168.1 | 139.2 | 17.2 |
| $7^{th}$ day | 210.1 | 163.9 | 22.0 |

As shown in Table 1 above, moisture content in the housing of Example 1 decreased by 17% or more as compared to the housing of Comparative Example 1. Such moisture content reduction is attributed to further including a gas blocking layer including nanostructures on edge portions of a housing according to an embodiment, which suppresses permeation of moisture into the housing.

As is apparent from the foregoing description, according to an embodiment, an electrochemical cell including a gas blocking layer including nanostructures has enhanced gas blocking characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. An electrochemical cell comprising:
an electrode assembly; and
a housing configured to accommodate the electrode assembly and comprising a first sheet and a second sheet,
wherein the first sheet comprises a first gas blocking layer, and a first sealing layer, and
wherein the second sheet comprises a second gas blocking layer, and a second sealing layer,
wherein the housing defines an accommodation region which accommodates the electrode assembly, which is disposed between the first sheet and the second sheet, and
wherein the housing comprises a bonded member, wherein the bonded member comprises a third gas blocking layer disposed between the first gas blocking layer and the second gas blocking layer,
wherein the third gas blocking layer comprises a plurality of nanostructures.
2. The electrochemical cell of claim 1, wherein the third gas blocking layer is separated from the accommodation region by a first portion of the first sealing layer and a second portion of the second sealing layer.
3. The electrochemical cell of claim 1, wherein the nanostructures are two-dimensional nanostructures.

4. The electrochemical cell of claim 1, wherein the nanostructures comprise a carbonaceous material.

5. The electrochemical cell of claim 1, wherein the nanostructures comprise at least one material selected from graphene, carbon nanotubes, carbon nanowires, carbon nanobelts, fullerene, and graphite.

6. The electrochemical cell of claim 5, wherein the graphene is exfoliated graphene.

7. The electrochemical cell of claim 5, wherein the graphene is at least one material selected from graphene oxide, reduced graphene oxide, and modified graphene oxide.

8. The electrochemical cell of claim 1, wherein the nanostructures comprise a non-carbonaceous inorganic material.

9. The electrochemical cell of claim 8, wherein the nanostructures comprise a layered clay.

10. The electrochemical cell of claim 9, wherein the nanostructures comprise at least one material selected from an organized layered clay, an intercalated layered clay, and an exfoliated layered clay.

11. The electrochemical cell of claim 10, wherein the nanostructures comprise a layered silicate.

12. The electrochemical cell of claim 11, wherein the layered silicate comprises at least one material selected from montmorillonite, bentonite, kaolinite, mica, hectorite, fluorohectorite, saponite, beidelite, nontronite, stevensite, vermiculite, hallosite, volkonskoite, suconite, magadite, and kenyalite.

13. The electrochemical cell of claim 8, wherein the nanostructures comprise a metal oxide.

14. The electrochemical cell of claim 13, wherein the nanostructures comprise at least one material selected from titanium dioxide, tin dioxide, alumina, zinc oxide, and silica.

15. The electrochemical cell of claim 1, wherein the third gas blocking layer comprises a polymer and the nanostructures.

16. The electrochemical cell of claim 1, wherein at least one of the first sealing layer and the second sealing layer comprises non-conductive nanostructures.

17. The electrochemical cell of claim 1, wherein at least one of the first gas blocking layer and the second gas blocking layer comprises at least one material selected from a metal, a metal oxide, a polymer, and a carbonaceous material.

18. The electrochemical cell of claim 1, wherein at least one of the first gas blocking layer and the second gas blocking layer has a multilayer structure comprising a plurality of layers.

19. The electrochemical cell of claim 1, wherein the first sheet further comprises a first external insulating layer, and the second sheet further comprises a second external insulating layer.

20. The electrochemical cell of claim 1, wherein at least one of the first sheet and the second sheet is more flexible than the electrode assembly.

* * * * *